US012789082B2

(12) United States Patent
Mundra et al.

(10) Patent No.: US 12,789,082 B2
(45) Date of Patent: Nov. 10, 2026

(54) COMPUTER-EXECUTABLE PROGRAM STARTING POINT

(71) Applicant: Comcast Cable Communications, LLC, Philadelphia, PA (US)

(72) Inventors: Arvind Mundra, Malvern, PA (US); Phillip Gabler, Doylestown, PA (US); Daniel T. Grady, Audubon, NJ (US); Nishant Doshi, Norristown, PA (US); Scott Laubach, Harleysville, PA (US); Paul Davis, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/152,492

(22) Filed: Oct. 5, 2018

(65) Prior Publication Data

US 2020/0108310 A1 Apr. 9, 2020

(51) Int. Cl.

| | |
|---|---|
| ***A63F 13/23*** | (2014.01) |
| ***G06F 16/738*** | (2019.01) |
| ***G06F 16/783*** | (2019.01) |
| ***H04N 21/81*** | (2011.01) |

(52) U.S. Cl.

CPC ............ *A63F 13/23* (2014.09); *G06F 16/739* (2019.01); *G06F 16/7837* (2019.01); *G06F 16/7844* (2019.01); *H04N 21/8133* (2013.01)

(58) Field of Classification Search

CPC .... A63F 13/23; G06F 16/7844; G06F 16/739; G06F 16/7837; H04N 21/8133

USPC ............................................................ 463/40

See application file for complete search history.

(56) References Cited

U.S. PATENT DOCUMENTS

| | | | | |
|---|---|---|---|---|
| 10,491,943 | B1 * | 11/2019 | Wahlquist-Ortiz ..... | A63F 13/46 |
| 10,709,983 | B1 * | 7/2020 | Dills ....................... | A63F 13/65 |
| 2011/0276372 | A1 * | 11/2011 | Spivack ............... | G06Q 10/109 705/14.5 |
| 2012/0194736 | A1 * | 8/2012 | Dasher ............... | H04N 21/4402 348/E5.009 |
| 2014/0236329 | A1 * | 8/2014 | DiSomma .......... | G06Q 10/0639 700/91 |
| 2015/0026708 | A1 * | 1/2015 | Ahmed ............ | H04N 21/44218 725/12 |
| 2019/0030435 | A1 * | 1/2019 | Dishman ................. | A63F 13/77 |

OTHER PUBLICATIONS

Wikipedia, "Representational state transfer", Sep. 1, 2018, retrieved from Internet via Wayback Machine from Internet URL <https://web.archive.org/web/20180901003619/https://en.wikipedia.org/wiki/Representational_state_transfer>. (Year: 2018).*

* cited by examiner

*Primary Examiner* — Ryan Hsu
(74) *Attorney, Agent, or Firm* — Banner & Witcoff, Ltd.

(57) ABSTRACT

Methods, systems, and apparatuses are described for identifying computer programs/video games that are compatible with a particular content stream and obtaining metadata indicating various different states of the content stream or event depicted in the content stream. The metadata may be supplied as input state information to the computer programs/video games to begin a simulation of the event depicted in the content stream or to initiate a video game session corresponding to the state of the content stream.

29 Claims, 10 Drawing Sheets

COMPUTER-EXECUTABLE PROGRAM STARTING POINT

BACKGROUND

Viewers of televised programs are often looking to additional ways to interact with their favorite shows. For example, many people watch televised sporting events, particularly sporting events that involve a favorite team or sport. Watching sporting events is often limited to viewing the sporting event on a television screen. Many homes also include video game consoles through which players can play video games on their televisions or other display devices. Such video games may allow a player to simulate a sporting event, but often begin at the beginning of the sporting event. Players and viewers are often looking for additional ways to extend their experience with televised programs and/or video games.

SUMMARY

The following summary presents a simplified summary of certain features. The summary is not an extensive overview and is not intended to identify key or critical elements.

Methods, systems, and apparatuses are described for identifying computer programs/video games that are compatible with a particular content stream that a user may watch and obtain metadata indicating various different states of the content stream or event depicted in the content stream (such as the score, player statistics, and other game progress information for a live football game). The metadata may be supplied as input state information to the computer programs/video games to begin a simulation of the event depicted in the content stream or to initiate a video game session corresponding to the state of the content stream.

These and other features are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
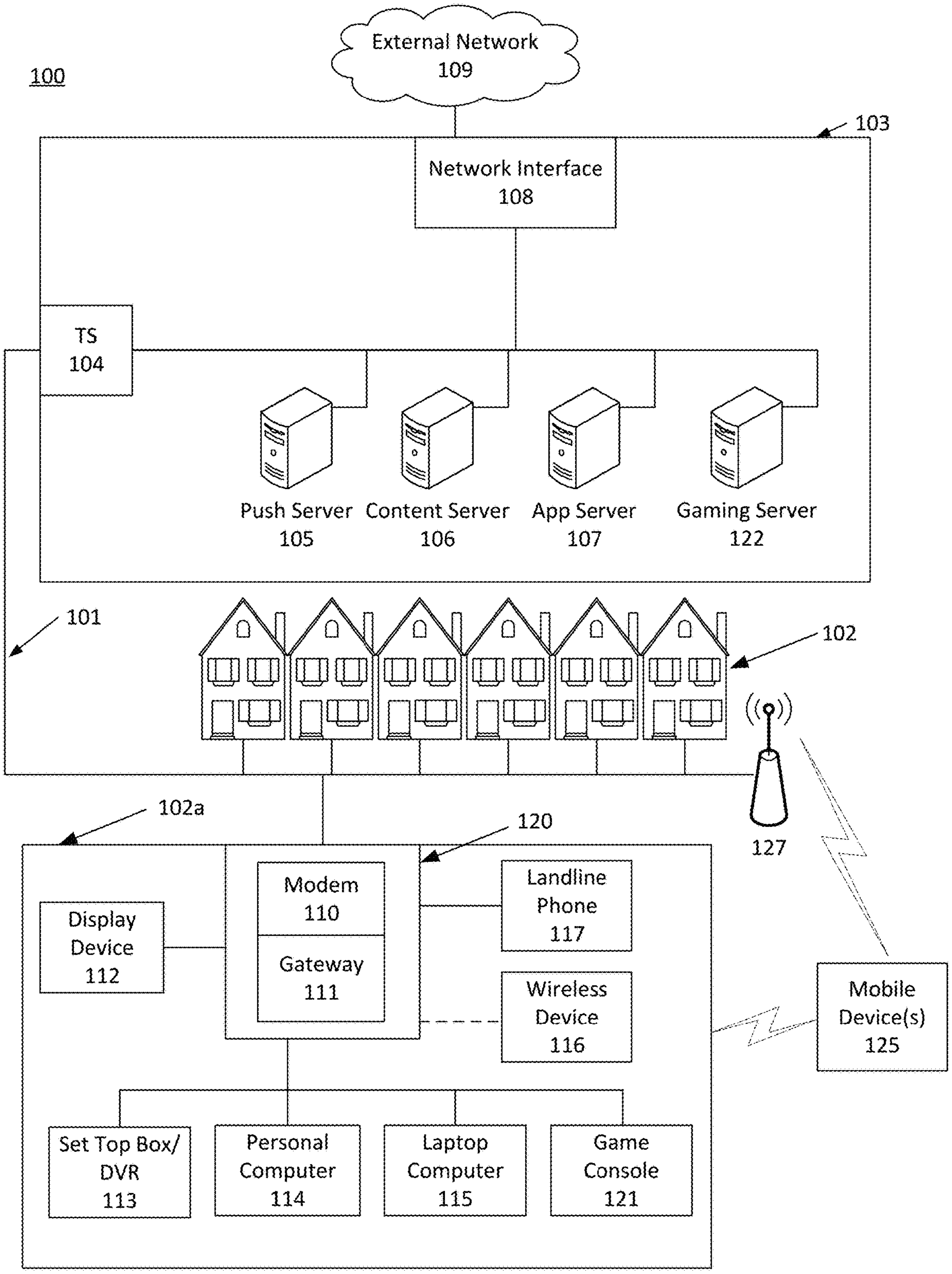
FIG. 1 shows an example communication network on which various features described herein may be implemented.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

The communication links 101 may originate from the local office 103 and may be split to exchange information signals with the various premises 102. The communication links 101 may include components not shown, such as splitters, filters, amplifiers, etc. to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links 101 and backend devices such as servers 105-107. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including a gaming server 122 (described below), additional push, content, and/or application servers, and/or other types of servers. Although shown separately, the push server 105, the content server 106, the application server 107, the gaming server 122, and/or other server(s) may be combined. The servers 105, 106, 107, and 122, and/or other servers, may be computing devices and may include memory storing data and also storing computer executable instructions that, when executed by one or more processors, cause the server(s) to perform steps described herein.

An example premise 102*a* may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102*a*, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/devices in the premises 102*a*, such as display devices 112 (e.g., televisions), additional STBs or DVRs 113, personal computers 114, laptop computers 115, gaming consoles 121, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102*a* may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

The mobile devices 125 may communicate with a local office 103. The mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. The mobile devices 125 may store, output, and/or otherwise use assets. An asset may be a video, a game, one or more images, software, audio, text, webpage(s), and/or other content. The mobile devices 125 may include Wi-Fi transceivers, cellular transceivers, satellite transceivers, and/or global positioning system (GPS) components.

The game console 121 may connect to gateway 111 through a wired or wireless connection. In other instances, the game console 121 may connect to the display device 112 through a wired connection and communicate with the gateway 111 or the modem 110 wirelessly. The game console provides for playing or interacting with video games displayed on the display device 112. Thus, game console 121 may include a controller or other interface to interact with the video game. In some instances, the game console may include virtual reality headsets or other virtual reality systems that provide a virtual reality experience for players. Any of the components discussed for network 100 may store the code or software of the video games playable through the game console 121. In still other instances, the game console 121 may be embodied within other components of the network 100, such as the personal computer 114, the laptop computer 115, the set top box 113, or any of the other servers of the local office 103. Thus, although the game console 121 is described as a separate computing device within the network 100, portions or all of the game console 121 may be embodied within other components of the network.

Figure 2:
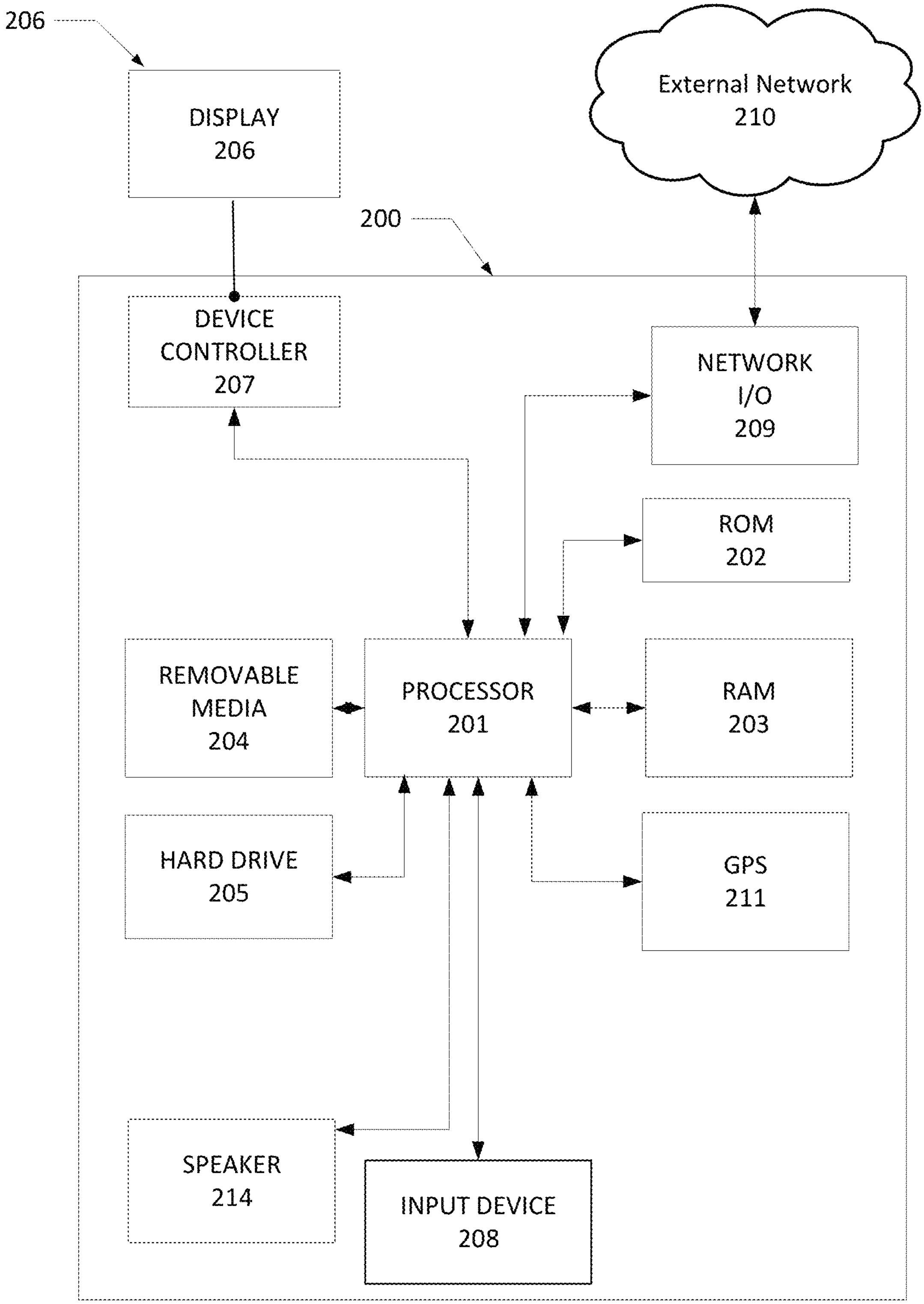
FIG. 2 shows an example computing device that may be used to implement any of the methods described herein.

FIG. 2 shows hardware elements of a computing device that may be used to implement any of the computing devices discussed herein (e.g., the gaming server 122 to obtain video stream data for use in a companion video game, the gateway 111 to transmit received video stream data to a game console and received inputs from the game console to the gaming server 122, and/or the game console 121). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

As mentioned above, the network 100 may provide for collecting state information associated with a video stream and providing the state information to a game console on which a companion video game is playable by a user based on a state of the video stream. In particular, the video stream of data may be provided by the local office 103 to premises 102. The video stream may include live content, such as one or more sporting events and/or pay-per-view events, recorded content, such as television content and/or movies recorded on a digital video recorder (DVR), on-demand content available from the network 100, etc. The video stream may include both a video component and an audio content such that a viewer may partake of the content on the display device 112. State information identifying aspects of the content may be included in the video stream, such as a title of the content, indications of participants of the sporting event, current statistics of a sporting event, actors or other participants to a movie or television show, or any other identifying information of the content such that the network 100 may obtain information of the video stream. Such state information may be generated by the network 100 and inserted into the video stream or may be provided by a third party to the network. For example, a third party system may provide real-time updated statistics of a sporting event to the network 100 that may then be included in the video stream. The statistics may be packaged with other video stream information by the network 100 or inserted into the video stream directly as a portion of the state information.

The network 100 may identify one or more companion video game for the content of the video stream. Although discussed as a video game or companion video game, the network 100 may use any type of gaming content. For example, video game or gaming content may include, but is not limited to, a virtual reality experience, a console video game executed on a video game console device, an online video game executed on a network device (such as a gaming server), a mobile device application, a video game executed on a personal computer, a video game executed on or transmitted to a set-top box, and the like. The state information of the video stream may be mapped to inputs to the one or more companion video games that allow a user to simulate the content based on the state information. For example, a video game that allows a player to simulate or otherwise play a football game with teams and players from the National Football League (NFL™) may be made available for playing on a gaming console 121. Video games for other sports and sporting leagues may also be available. In addition, television programs and/or movies may have companion video games that include similar characters, story arcs, settings, etc. For example, the Star Wars™ franchise may include several companion video games that allow a player to experience the settings/characters created within the franchise. State metadata from a video data stream may thus be importing to a game console on which a companion video game is playable by a user based on the state of the video data stream.

Figure 3:
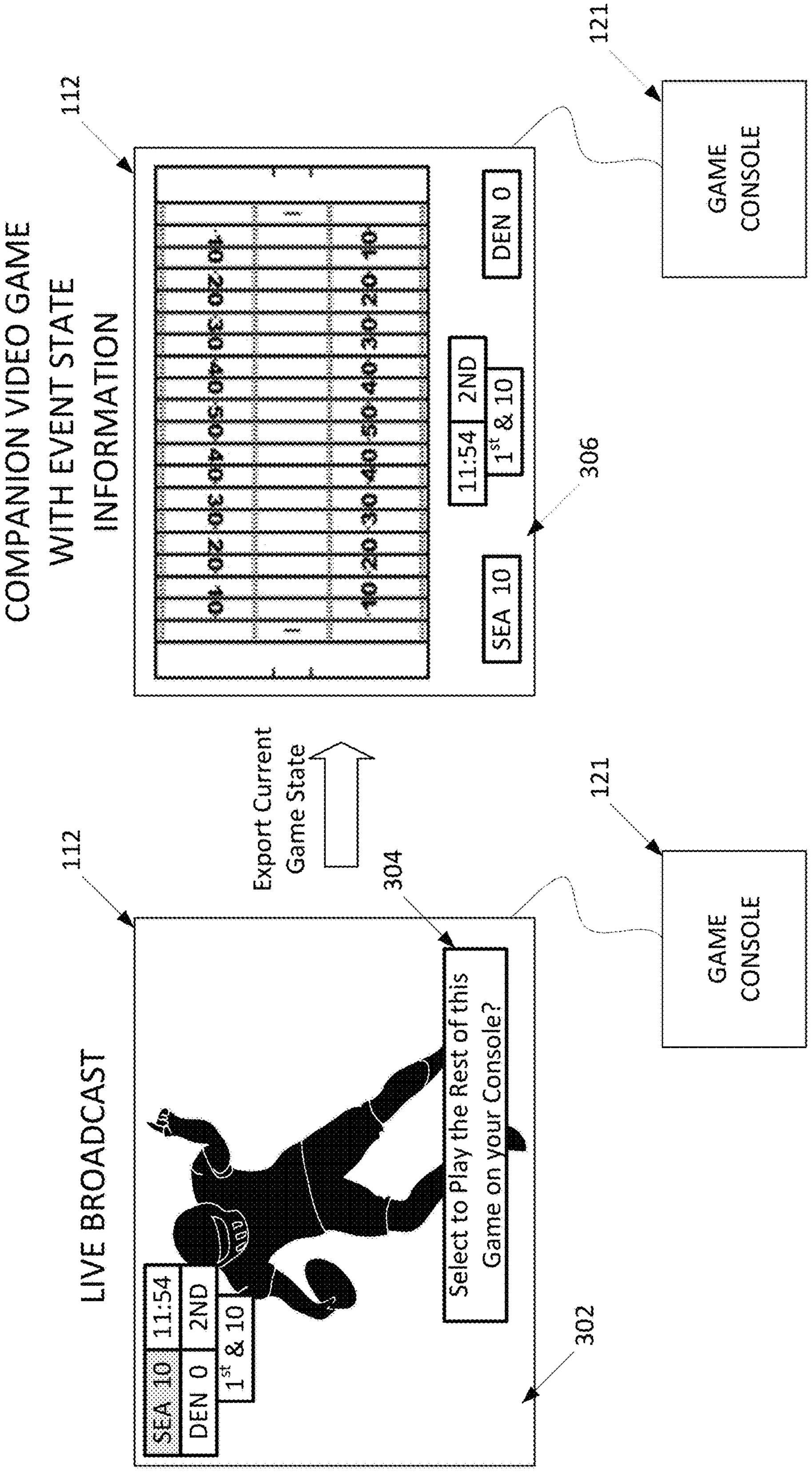
FIG. 3 is a diagram illustrating exporting video stream data from a streaming device to a game console to create a companion video game session.

FIG. 3 is a diagram illustrating exporting even at state information of a video stream from a streaming device to a game console to initiate a companion video game session. Exporting event state information from the video stream to initiate the companion video session may be performed by any components of the network 100 discussed above. For example, the game console 121 may be in communication with the display device 112 to provide images of the video game for playing by the player of the video game. Other components, such as the gaming server 122 and the gateway 111, may also aid in transmitting event state information from the video stream to a game console 121 to initiate a companion video game session. Variations in the network configuration for providing the companion video game session to a video stream are presented in more detail below.

As shown in FIG. 3, a viewer may be viewing a video stream of content 302 displayed on a display device 112. The video content 302 may be provided by the local office 103 to the premises 102, as described above with relation to FIG. 1. In the particular example shown, the video stream content 302 includes a football sporting event. A game console 121 device may be connected to the display device to display a video game executed by the game console. The game console 121 may also communicate with one or more components of the network 100, such as the gateway 111 or the gaming server 122 to facilitate executing the companion video game. As explained in more detail below, the network 100 may determine if a companion video game is available for the content 302 of the video stream. For example, the network 100 may determine if a companion football-type video game is available for the content 302 of the video stream. If a companion video game is available, the network 100 may prompt a viewer of the video stream, such as through prompt 304, to play the companion video game to the video stream content 302.

If the viewer selects to play the companion video game, the companion video game may be launched by the game console 121 and some portion of the video game 306 may be displayed on the display device 112. Event state information representing a current state of the video content 302 may then be exported or transmitted to the game console 121 such that the video game session 306 may begin at a point similar to a current or recent state of the content of the video stream and based on the event state information associated with the video stream. For example, the statistics associated with the football sporting event of the content 302 of the video stream, such as score, teams, rosters, time of the game, team with possession, position on the field, etc., may be transmitted or otherwise exported to the companion video game 306. The game console 121 may launch the companion video game and may incorporate the statistics and other event state information to provide a starting condition of the video game. As illustrated in FIG. 3, the football sporting event of the content 302 of the video stream includes a team from Seattle and a team from Denver, with the Seattle team leading 10-0 with 11:54 remaining in the $2^{nd}$ quarter. This information and statistics may be included in the event state information for the content 302 and exported to the video game console 121. The video game console 121 may launch a companion video game 306 that related to the football sporting event of the content 302 of the video stream and insert or otherwise process the event state information such that the a player of the video game may begin with Seattle leading Denver 10-0 with 11:54 remaining in the $2^{nd}$ quarter. Other aspects of the state of the content 302 of the video stream may also be included in the event state information and processed by the game console 121, such as team with possession of the ball, player statistics for the sporting event, placement of the ball on the field, etc. A player of the companion video game may then play or simulate the remainder of the football sporting event from the state indicated by the exported event state information.

The event state information transmitted to the game console 121 may also include scenes, characters, settings, etc. from a movie or television program corresponding to a point in the narrative of the content of the video stream. A playable companion video game session may then be launched in a companion video game. The companion video game session may begin from the transmitted event state information that is processed into the video game to allow a player of the companion video game to play a scene corresponding to a state of the content of the video stream. For example, the event state information for a movie may include which characters are illustrated in a particular scene within the content of the video stream, a location within the movie the characters are located, and the weapons available to the characters. This event state information may then be exported to the video game console 121 and a companion video game to the movie may be launched with the characters within the video game located in a similar location and with the same weapons as included in the event state information. In this manner, aspects of a content of a video stream may be created in a virtual gaming session to allow players to play along with the content of the video stream on a companion video game.

The network 100 may provide additional experiences with a companion video game based on a streaming event of a video stream. For example, the gaming server 122 may store various sets of event state information corresponding to different states of the content in a video stream. Indicators of the stored sets of event state information may be presented to and selected by a viewer of the video stream for playing on the companion video game. In the example of the video stream including a football sporting event, the network 100 may store sets of event state information for various states of the football event, such as at the beginning of each quarter, at the most recent touchdown or score, at the beginning of a current drive, etc. The states of the event at which a set of event state information is stored may be defined or otherwise determined by a viewer of the stream. Event state information associated with content of a video stream may continue to be transmitted to the gaming console 121 while a companion gaming session is in progress. Such state information may be incorporated into the companion gaming sessions during play to update the session to the most recent data or statistics of the content of the video stream. The companion gaming session may also be simulated by the game console 121 or other component of the network 100 to completion and the results may be provided to a viewer of the video stream, to multiple viewers of the video stream, to participants of a content of the video stream, or to any number of components of the network 100. The various alternatives of the companion gaming session to content of a video stream provide for additional areas of revenue for the network 100 associated with the video stream of content.

Figure 4:
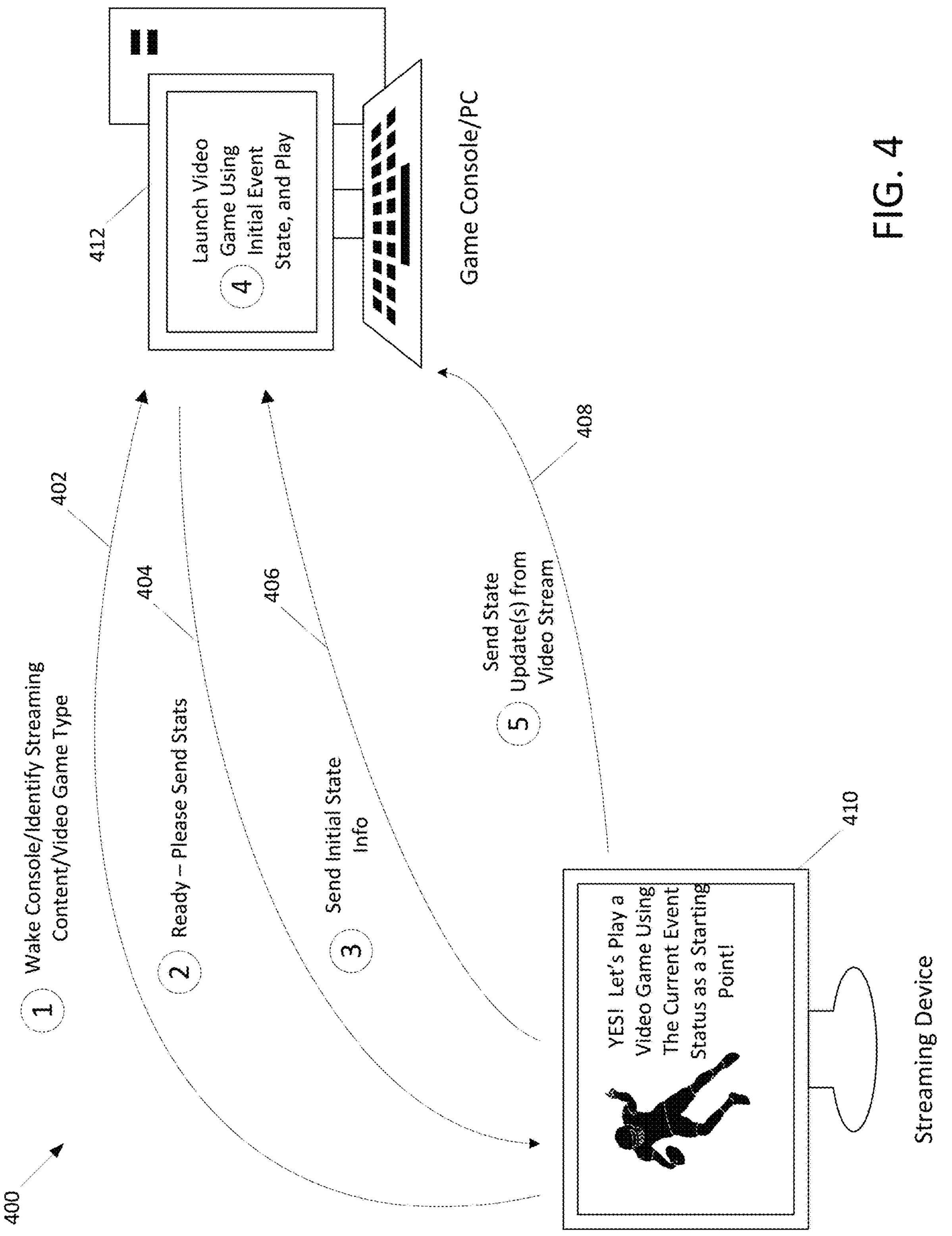
FIG. 4 is a diagram illustrating a flow of data between a streaming device and a game console to provide a companion video game session to a video stream.

FIG. 4 is a diagram 400 illustrating a general flow of messages and data between a streaming device 410 and a game console 412 to provide a companion video game session to a video stream. The steps included in the flow of data are described in more detail below and are provided here as a general outline. For example, a viewer may be watching a football sporting event on a living room television. A message may be displayed on the television to query the viewer to play the current state of the football sporting event on a companion football-type video game on a viewer's game console. If the streaming device 410 receives an indication from the viewer to play a companion gaming session to the content of the video stream, the streaming device 410 may transmit 402 a request to the game console 412 to wake and launch the companion video game. The transmission 402 may also include an identification of the content of the video stream (such as a football sporting event). Although the streaming device 410 is discussed as a display device, the streaming device may be any computing device that receives streaming content from a providing network. The streaming device 410 may be a smart television, a mobile computing device (such as a cellular phone, tablet, laptop, etc.), a desktop computing device, and the like. Similarly, although discussed as a game console device 412, the game console 412 of FIG. 4 may be any computing device configured to execute code or software of a video game to allow a player to play a video game, including smart phones, laptop computers, desktop computers, and the like.

Based on the request from the streaming device 410, the game console 412 may transmit a data request 404 to the streaming device 410 to request initial event state information associated with the content of the video stream and the companion video game. The streaming device 410 may transmit 406 the initial event state information associated with the content of the video stream to the game console 412. The initial event state information of the content of the stream may be consolidated in a batch file which is transferred to console device 412 for use by the console device in creating the companion video game to the content of the video stream. One or more Application Programming Interfaces (APIs) may be included in the streaming device 410 and/or the game console 412 to aid in transferring information between the devices.

The game console may launch the companion video game with the initial event state information incorporated into the video game session to allow a player to play the companion video game. In addition, the streaming device 410 may periodically, or based on events within the content of the video stream, transmit 408 updated event state information corresponding to an updated state of the content of the video stream. The game console 412 may use the updated event state information of the video stream to alter the companion video game to correspond with a change in the state of the content. For example, the football sporting event of the video stream may reach halftime while a player is playing the companion video game to the football sporting event. Updated event state information corresponding to the statistics of the football sporting event at halftime may be generated and transmitted to the game console 412. A player of the companion video game may select to update the video game with the updated event state information to begin playing the football video game from the halftime state of the content of the video stream.

Figure 5:
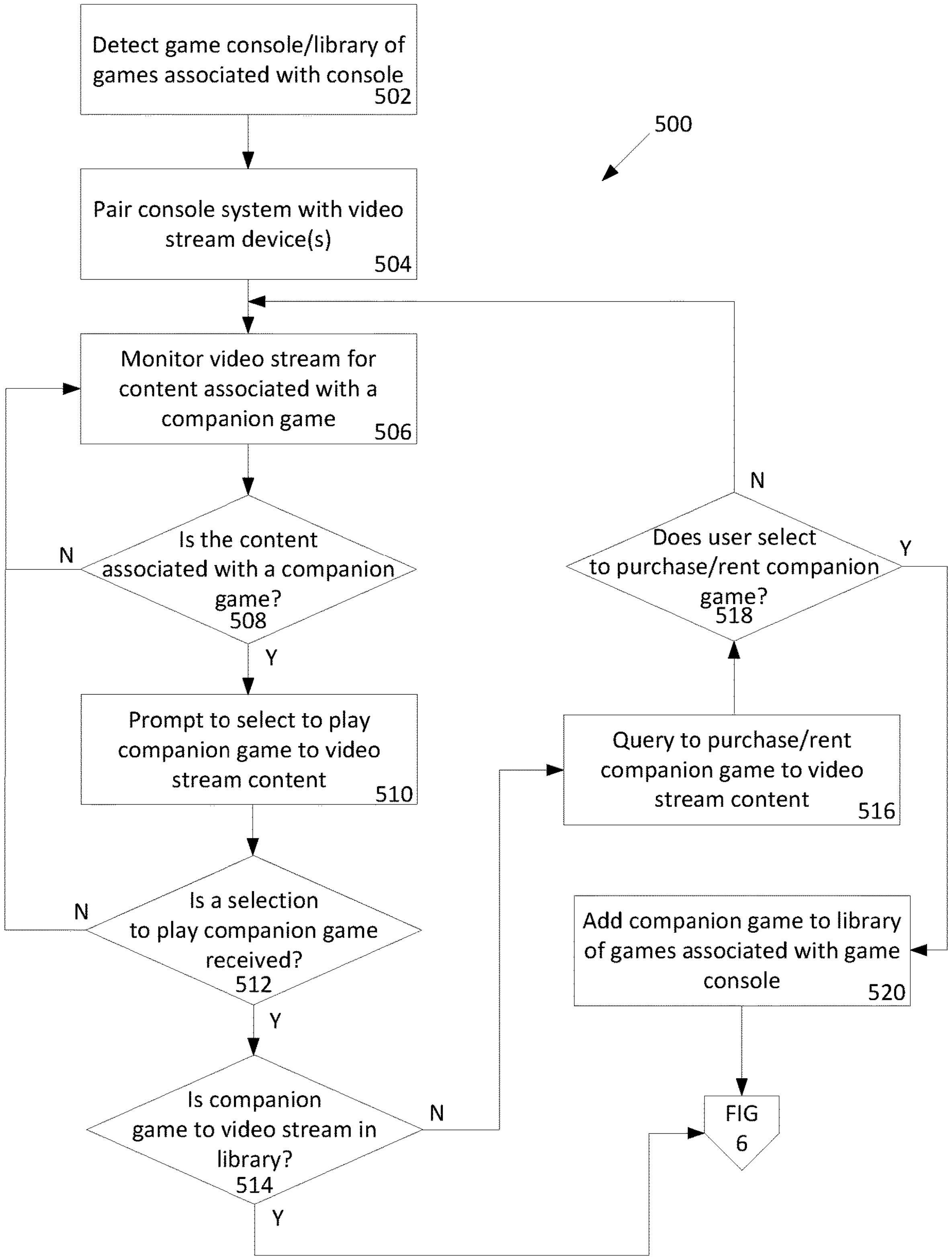
FIG. 5 is a flow chart showing an example method for pairing a video stream to a companion game of a game console.

FIG. 5 is a flow chart showing an example method 500 for pairing a video stream of a streaming device 410 to a companion video game of a game console 412 device. The steps of the method 500 of FIG. 5 provide a more detailed description of transmission 402 of FIG. 4 discussed above. The method 500, or one or more operations of the method, may be performed by one or more computing devices or entities. For example, portions of the method 500 may be performed by components of the network 100 or the computing device 200. The method 500 or one or more steps thereof may be embodied in computer-executable instructions that are stored in a computer-readable medium, such as a non-transitory computer readable medium. The steps in this flow chart need not all be performed in the order specified and some steps may be omitted or changed in order.

At step 502, the gaming server 122 detects a game console system and/or a library of available video games associated with the game console. The game console 412 may be any computing device configured to execute software or programs of a video game. The game console 412 may be a dedicated computing device for video games or may be a multi-purpose computing device (such as a desktop computer or a smart phone) on which video games may be played. A collection of video games may be associated with the game console 412. For example, the game console 412 may store the video game code in a storage device connected to the game console. The video game code may also be stored on one or more storage discs separate from the console and a listing of each video game associated with the console may be stored by the console. The game console 412 and/or the library of available video games may be a part of a communication network 100, such as that described above with relation to FIG. 1.

At step 504, the console system may be paired with a streaming device 410 that processes streaming video content from a streaming content source. The streaming device 410 may be any computing device that receives a video stream, including a set-top box, a desktop or laptop computer, a mobile phone, etc. The devices may be paired over a wired connection (such as with a High Definition Multimedia Interface (HDMI) cable), a shared Wi-Fi network, or any other shared communication. The shared devices may exchange messages, data, requests, responses, and the like such that the streaming device 410 communicates with the console system, and vice versa. For example, Javascript Object Notation (JSON) messages exchanged via a Hypertext Transfer Protocol Secure (HTTPS) communication protocol can be used for the communication between the shared devices. An API server could handle the pairing process, simplifying pairing for automation; providing help for the devices to complete and to maintain the pairing. One or more APIs could also be used to transfer the information between steaming device 410 and the game console 412. The streaming device 410 or the console system 412 may have a menu interface to set up the pairing with the corresponding device. A user of the streaming device 410 may select from available devices to create a paired relationship between the devices. The menu may provide a utility to search, select and pair the console device. In the process of pairing, the user may grant permission of data flow from streaming device 410 to console device 412, or vice versa.

At step 506, the streaming device 410 or any other device of the communications network 100 (such as the gaming server 122 discussed above) may monitor the stream of video content transmitted to the streaming device from a content source to determine if the content of the stream has a companion video game associated with the content. For example, the content of the video stream may include a football sporting event, and one or more football-based video games may be available for playing on one or more gaming consoles. The content of the video stream may also include a movie or television program of which a companion video game is available. To monitor the video stream for content associated with a video game, the streaming device 410 may obtain metadata or other identifying information from the video stream. This information may include a title or other descriptions of the content of the video stream. The metadata information of the video stream may include other information identifying one or more companion video games to the content of the video stream. For example, the provider of a program guide information for a particular sporting event may include, with the program guide information (e.g., metadata accompanying a textual description), identification of a genre of companion video game, or a listing of specific companion video game titles to the sporting event. The companion video game information or identification may also be inserted into a video stream by the communication network 100 providing the video stream For example, the network 100 may identify all or some of the content assets available from the network and insert metadata identifying any potentially companion video games to the content assets.

The metadata of a video stream may also identify the event state information that each particular companion video game of the content of the video stream may accept. For example, a video stream of a football sporting event may provide statistics of the sporting event that includes the teams involved, the progress in game time (quarter, time remaining), the team scores, individual player statistics, team statistics, ball possession, position on the field, etc. Some companion video games to the content of the video stream may accept all or a portion of the provided event state information and others may not. Monitoring the video stream for content associated with a companion video game may include identifying those video games that accept some or all of the provided event state information. For example, a video stream that includes a football sporting event may have several potential companion video games associated with the sporting event. However, metadata of the video stream of the sporting event may identify that only individual player statistics are included in the event state information for the sporting event. One or more of the potential companion video games to the football sporting event may not accept or otherwise cannot process individual player statistics into the companion video game. Such video games that cannot process the event state information of a particular content may not be included in a list of potential companion video games to the content.

The gaming server 122 may determine in step 508 if the content of the video stream is associated with one or more companion video games. To determine if the content is associated with a companion video game, a list of one or more available content items from the network 100 may be associated with a companion video game. The list of companion video games to a content item of a video stream may be generated by the network 100 and provided to the gaming server 122 for storage or reference. The list of companion video games to a content item of a video stream may also be stored at the gaming console and provided to the gaming server 122 or streaming device 410 upon a request for the list.

Some content items of the network 100 may be associated with more than one companion video game. For example, a video stream that includes a baseball sporting event may be associated with several baseball video games of varying game console 412 systems, manufacturers, developers, etc. If more than one companion video game is available, the network 100 may select which of the available games may be provided to the viewer for selection based on information of the viewer and/or the video stream. For example, if multiple companion games are available for the content of the video stream, a state of the content may be used to determine which companion video game to offer, such as a sword fighting companion video game for a first state in the video stream and a flight simulator companion video game for a second state in the video stream. Metadata or other embedded markers included in the video stream of the content may indicate which of the multiple companion video games to offer for playing the state of the content of the video stream. The metadata may also provide a table or listing indicating which companion video games for the content of the video stream to offer at different time portions of the video stream. Noted favorites or preferred companion video games of the viewer may be presented first to the viewer of the video stream for playing. Producers or manufactures of some companion video games may pay a fee to the network 100 to include certain companion video games to particular content of the video stream.

Some content items of the network 100 may be associated with a single video game, such as one that includes similar characters, settings, storylines, etc. Still other content items of the network 100 might not be associated with any companion video games if no similar video game has been produced or otherwise made available to the video stream content. If no companion video game is identified for the content of the video stream, the method 500 returns to step 506 to monitor the video stream for content that is associated with a companion video game.

If the streaming device 410 determines that the content of the video stream is associated with one or more companion video games, a prompt, in step 510, to play one or more companion games to the content of the video stream may be displayed on the display device. The prompt may allow a selection from multiple companion games included in the video game library or a particular companion video game in the library. An example of a prompt 304 to selection a companion video game to the content of the video stream is shown in FIG. 3. Through an input device, such a remote control to the streaming device 410, a viewer may select or otherwise respond to the prompt to play the companion video game. The prompt may include a selection of yes or no to pay the identified companion video game or may provide a list of companion video games to the content of the video stream from which the user may select a preferred companion video game.

At step 512, the streaming device 410 may determine if a selection to play a companion video game is received. If a selection to play the companion video game is not received, the streaming device 410 returns to monitoring the content of the video stream at step 506. If a selection to play the companion video game is received, the streaming device 410 continues to step 514 to determine if any of the companion video games are included in a video game library for the game console 412. The video game library for the game console may be maintained by components of the network 100 (such as the gaming server 122) or by the gaming console 412. The video game library may include video games available to the gaming console 412, such as those video games downloaded and stored at the gaming console 412. The gaming console 412 may provide a list of video games associated with or stored at the gaming console to the streaming device 410 or other components of the network 100 for reference by the streaming device when determining if the content of the video stream has an associated companion video game. A request to the gaming console 412 to determine if the companion video game to the content of the video stream is in the video game library may also be sent to the gaming console. If the selected companion video game is associated or otherwise available to the gaming console 412, the streaming device 410 continues to perform the steps of the method 600 of FIG. 6, discussed below.

If no companion game to the content of the video stream is included in the video game library of the game console 412, the streaming device 410 may query a viewer of the video stream to purchase or rent a companion video game to the video stream in step 516. The query may comprise a prompt on the display device to purchase or rent the companion video game. In step 514, the streaming device 410 may determine if a selection to purchase or rent the companion video game is received. If not, the streaming device 410 may return to step 506 and monitor the content of the video stream for content associated with a companion video game. The streaming device 410 may store the user's inputs and limit the number of prompts to play a companion video game for the content of the video stream. For example, the streaming device 410 may prompt the user to play the companion video game once per day, once per view of the video stream, when a new companion video game becomes available, once per the lifetime of the video stream, etc.

If a selection to purchase or rent the companion video game is received, all or some of the selected companion video game may be added to the library of video games of the game console 412 at step 520. In some instances, multiple companion video game options may be presented for purchase or rent. A cost to rent or purchase a companion video game may be levied against an account associated with the viewer. To purchase or rent the companion video game, a request may be sent to the gaming console to download the companion video game from a video game repository and store the downloaded game for execution by the gaming console. The video game repository may be included in the communication network 100 or may be a third party video game repository. The payment for the companion video game may also be conducted through the network 100 or the third party video game repository to facilitate the purchase/rent of the companion video game. The streaming device 410 may proceed to perform the steps of the method 600 of FIG. 6.

Figure 6:
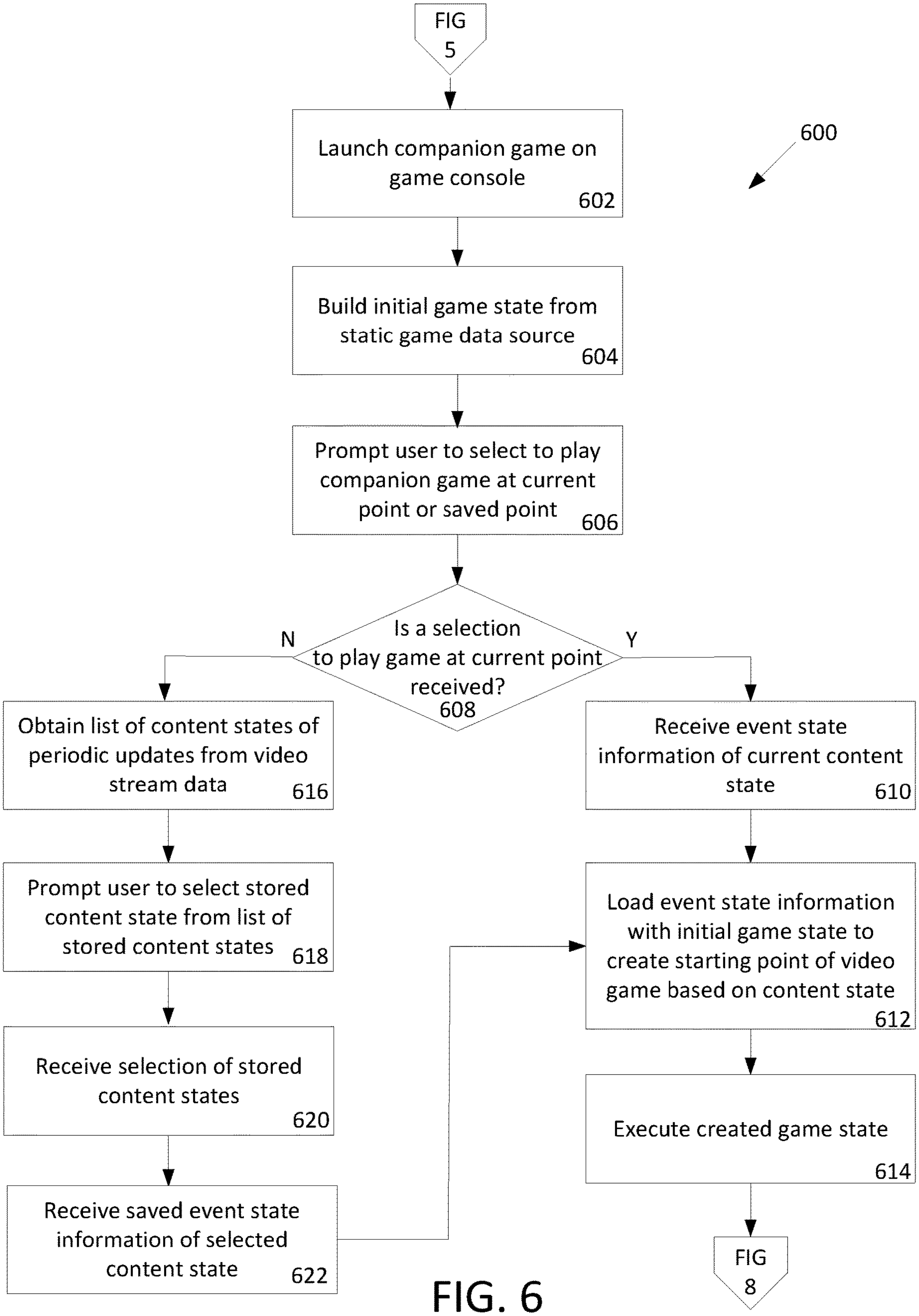
FIG. 6 is a flow chart showing an example method for creating a playable game session from data from a video stream.

FIG. 6 is a flow chart showing an example method 600 for creating a playable video game session based on data from a video stream. The steps of the method 600 provide a more detailed description of transmissions 402-406 of FIG. 4 discussed above. The method 600, or one or more operations of the method, may be performed by one or more computing devices or entities. For example, portions of the method 600 may be performed by the streaming device 410 and/or the game console 412 of FIG. 4. The method 600 or one or more steps thereof may be embodied in computer-executable instructions that are stored in a computer-readable medium, such as a non-transitory computer readable medium. The steps in this flow chart need not all be performed in the order specified and some steps may be omitted or changed in order.

At step 602 of the method 600 of FIG. 6, the selected companion video game to the video stream may be launched by the game console 412. Launching the companion video game may comprise sending a request to the game console 412 with an identification of the companion game to begin the game. The game console 412 may obtain the selected companion video game from the video game library and begin executing the code of the video game. At step 604, the game console 412 may build an initial game state from a static game data source obtained from the code of the companion video game. The initial game state may be a game state that comprises the structure of the video game upon which the received event state information associated with a current state of content of the video stream may be applied. For example, the initial game state of the video game may comprise the video game environment, the movement mechanics of states within the video game, the characters or avatars of the players of the video game, etc. For a football-based video game, the initial game state may comprise the football stadium(s) for playing the game, the rosters of the teams of the league, the rendered avatars for the players in the league, etc. The initial video game state provides the base upon which data from the video stream may be applied to create a scenario within the video game environment corresponding to the content of the video stream.

The initial video game state may be created by the streaming device 410 or another component of the network 100 (such as the gaming server 122) and sent or otherwise provided to the game console 412 for execution. In one example, the gaming server 122 may retain a copy of the code of the selected companion video game and execute the code upon selection to play the companion game to create the initial game state. A component of the network 100 may also generate a portion of the initial game state and provide the portion to the game console 412 for combination with other portions of the initial game state.

At step 606, a player of the companion video game is prompted to select to play the game at a current point corresponding to the content of the video stream or at a saved point within the content of the video stream. The companion video game may import event state information associated with content of a video stream and use that event state information to create an game state of the video game corresponding to a state of the content. For example, if the football sporting event had the score tied 10-10 in the $4^{th}$ quarter, then the video game may begin in the same state, the score tied 10-10 in the $4^{th}$ quarter, and the user may take control of one of the teams to play the remainder of the football game. Thus, to the content of the video stream may be played with event state information corresponding to a current or recent state of the content of the video stream or with event state information corresponding to a saved state of the content of the video stream. A viewer of the video stream or player of the companion video game may be prompted to select which point within the content of the video stream to play, as explained in more detail below with reference to FIG. 7A. If a selection to play the video game at a current or most recent point of the content of the video stream is determined in step 608, the game console 412 receives event state information corresponding to the current or most recent content of the video stream. The event state information may comprise any data or statistics corresponding to a state of the content of the video stream. In the football video game example, the event state information may comprise a current state of a football sporting event of the video stream, such as the elapsed time and which quarter of the game, the current or recent score, the teams playing, the rosters of the teams, injuries to players, a down and distance, which team has possession of the football, the number of remaining timeouts, etc. For a narrative-based companion video game to a narrative content video stream (such as a companion action video game to an action movie), the event state information may comprise a particular scene within the narrative that the content of the video stream has reached, the characters included in the scene, an environment in which the characters of the narrative are located, etc. For example, the content of the video stream may be of an aerial dogfight between airplanes as part of a movie or television program. A companion video game to the content of the video stream may comprise playing as one of the characters in an aerial dogfight against another character. The characters, environments, locations within the environment of the characters, etc. may be sent to the game console 412 as part of the event state information to allow a player to play the scene within the video game. In general, any data or statistic that may be used by the companion video game to create a companion, playable experience within the video game may be sent to the game console 412.

At step 612, the gaming console 412 loads the event state information with the initial game state to create a starting point of video game based on the content state. The event state information from the video stream may be applied to the initial game state to populate the initial game state with the information and/or statistics of the event state information. For example, the initial game state of a football-based video game may have rendered the football stadium for the game, the teams of the league, the player mechanics, etc. The event state information may then be applied to the base game state to define the rosters, injuries, statistics of the game, the time remaining and quarter, the score, etc. that corresponds to the content of the video stream. In this manner, the state of the content of the video stream may be imported into a companion video game. Not all of the provided event state information may be loaded with the initial game state. Rather, some companion video games might just use the scores and game progress/possession while others might give the player the option to further import dynamic player statistics.

The game console 412 may load the event state information with the initial game state received from the streaming device 410, in one instance. Other components of the network 100, such as the streaming device 410 or the gaming server 122 may load the event state information with the initial game state and transmit the game state to the game console 412. The game console 412 may execute the game state in step 614 to allow a player to play the video game from the point corresponding to the state of the video stream.

Many game console 412 devices may be used to execute the game state. For example, a virtual reality headset or system may execute the video game state to generate a virtual reality experience of the content of the video stream. A desktop or laptop computer may be used to execute the game state for playing the video game on a computer screen. Other game consoles 412 comprise mobile devices such as smart phones, dedicated gaming consoles such as XBOX™ and PLAYSTATION™, the gaming server 122 of the network 100, or any other computing device that executes code of the companion video game.

Execution of the video game may comprise receiving inputs at the game console 412 from an input device such that a player can play the game with the event state information from the video stream included or may include simulations of the video game from the point determined by the event state information. For example, the companion video game may be configured to simulate the video game from the state corresponding to the content state to some completion, such as the end of the football game or the end of the narrative, with some or no input received from a player of the game. The results of such simulations may be provided to one or more users of the communication network 100. A simulation of the content of the video stream on the companion video game may be provided to a viewer of the video stream on the streaming device 410. For a video stream of a football game, simulations from a current or recent point within the football game may be simulated by the game console 412 to determine which team won in the simulation. The winning team, or any other result from the simulation, may be provided to the streaming device 410 and displayed to the viewer of the content. Simulation results from any number of game consoles associated with the communication network 100 may be aggregated and provided to users of the network in a similar manner. For example, multiple viewers of the video stream may simulate the content of the video stream on respective game consoles from the event state information of the content of the video stream. The results of each of the simulations may be provided back to the network 100 (such as to gaming server 122) and aggregated to provide combined result to users of the network 100. In the example of the video stream including a football game, the multiple simulations may be aggregated at the gaming server 122 and a percentage of simulated wins by each team may be provided to viewers of the video stream. For narrative-based content in the video stream, the results of the multiple simulations may determine a particular ending from a variety of possible endings be selected and inserted into the content of the video stream to provide alternative narrative possibilities to the content.

Execution of the companion video game may also comprise receiving edits to the state of the game state from a player of the video game prior to or during playing the game. For example, the event state information from the video stream may indicate that a particular athlete in the football game of the content stream is injured and unavailable for the rest of the game. This information may be transmitted to the game console 412 as part of generating the event state information for playing. However, a player of the video game may desire to play or simulate the football game as if the athlete was not injured and remained in the game. In this scenario, the player may alter the game state during play to insert the injured athlete back into the video game and play the game. In general, any data or information included in the event state information from the video stream used to create the video game state based on the content may be altered by a player during play of the video game to simulate or play scenarios that may differ from the content of the video stream.

The companion video game may allow for a multi-player versions of the companion video game. In this example, multiple users of the network 100 may select to play the companion video game of content of a video stream. The event state information used to generate the video game state based on the content of the video stream may be the same data for each user that selects to play the companion video game, particularly as the users may be viewing the same video stream on separate streaming devices 410. The companion video game sessions for each of the users may be in communication with the gaming server 122 of the network 100 for connection between the gaming sessions. In this manner, the players of the companion video game may play the game simultaneously in a head-to-head format or in a group/campaign format, but starting from a point within the video game corresponding to the content of the video stream and based on the event state information from the network 100. Inputs received from the multiple players of the companion video game may be aggregated and combined, in some instances, to provide for crowd-sourcing of inputs to the companion game. Receipt and aggregation of the inputs may occur at the gaming server 122 of the communication network 100. Control of the companion video game, either at each game consoles 412 associated with the players or at the gaming server 122, may be based on the aggregated inputs. For example, the gaming server 122 may execute the companion video game of a football game of the video stream. Multiple players may select to play the companion football video game on their respective streaming devices 410 and may be connected to the gaming server 122. Inputs to the gaming server 122 from the multiple players may determine a type of play that occurs within the video game, such as a passing play or running play. In one example, the play that receives the highest number of selections by the players of the video game may be executed within the video game by the gaming server 122. Other character and game controls may be similarly aggregated and used to control the outcome of the companion video game.

Figure 7A:
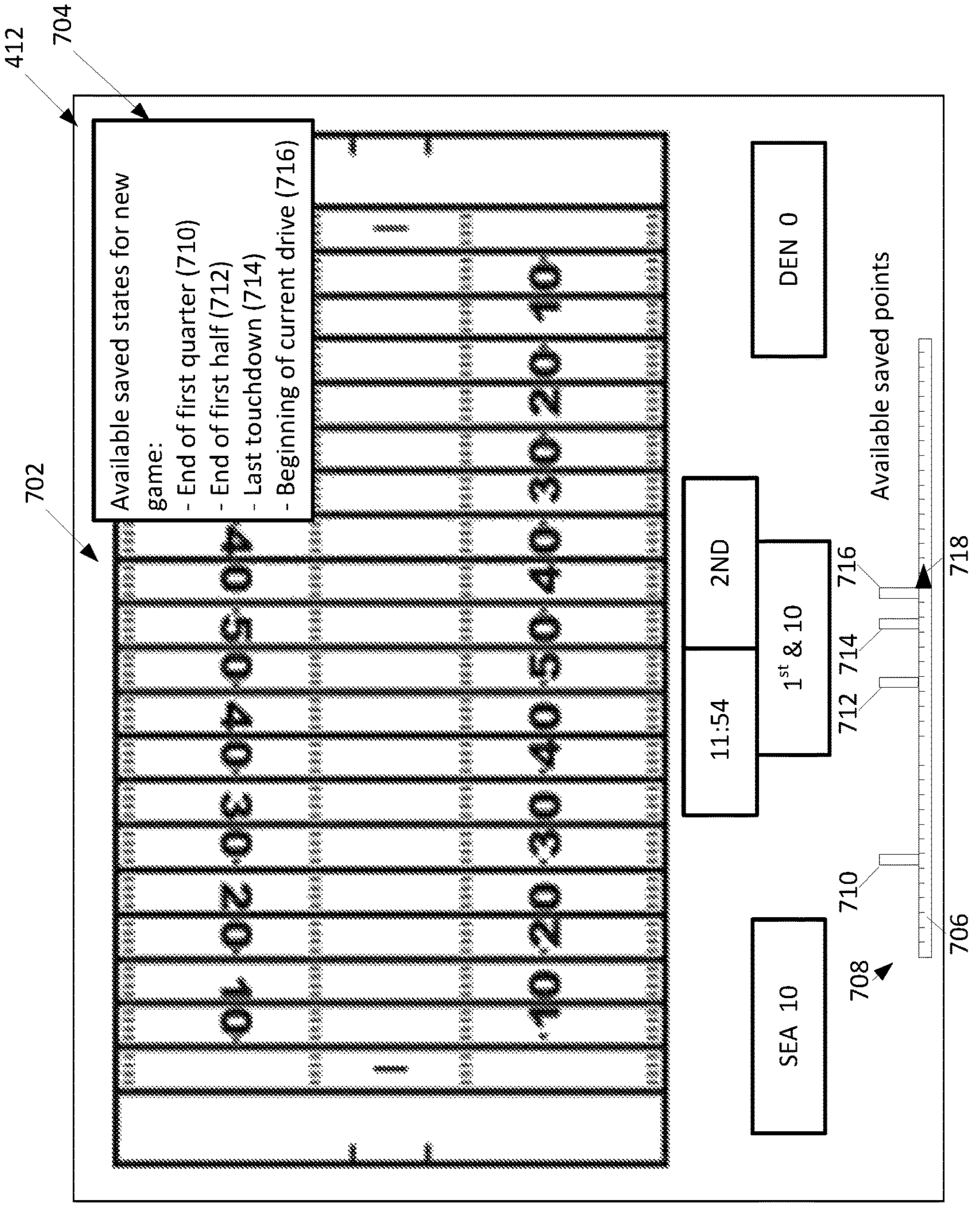
FIG. 7 is a screenshot of a video game paired with a video stream prompting a user to select a saved state within the video stream for creating a playable game session.

As mentioned above, the network 100 may also provide saved points within the content of the video stream from which companion video game states may be created and played. Returning to step 606 of the method 600 above, the user is prompted to play the companion video game at a current point or a saved point. If the user selects to play from a saved point rather than a current point in the video stream, the game console 412 may obtain a list of stored states of the content of the video stream in step 616 and prompts the user to select from the list of stored content states in step 618. Reference is now made to the screenshot 702 of FIG. 7A illustrating a video game of a game console 412 paired with a video stream prompting a user to select a saved state within the video stream for creating a playable game session.

The screenshot 702 of the companion video game comprises the video game setting and a prompt 704 for selecting an available saved state within the content of the video stream paired with the companion video game. In the example shown, the video game is a football-based video game such that the saved states may correspond to points within the football sporting event content of the video stream, such as the end of the first quarter, the end of the first half, the last touchdown scored in the football game of the content of the video stream, the beginning of the most current drive, etc. The saved points within the content of the video stream may be determined by the type of content and one or more rules of the gaming server 122 or other component of the network 100. For example, any device of the network 100 may be configured to create a stored content state of the companion football video game at the beginning of each quarter. For a narrative-based companion game, the network 100 may be configured to create a stored content state of the companion video game at the beginning of every scene, at the beginning of a chapter, at the introduction of a playable scene, etc. A list of saved points within a type of video stream may be stored by the network 100 for generation of game states for one or more companion games for use when generating saved game states for the content of a video stream.

To generate a save video game state, the streaming device 410 or other component of the network 100 may analyze the content of a video stream that is associated with one or more companion video games to determine if a save point is reached. The analysis of the content may comprise an image analysis of the video stream, analyzing metadata included in the stream for an identifier of a save point, determining an elapsed time or number of frames from the beginning of the content, and the like. The save points for the content of the video stream may be obtained from the list of save points for the companion video games or type of content of the video stream. If a save point is reached within the video stream, event state information for the companion video game and associated with the content of the video stream may be received. Similar to above, this data may comprise statistics, data, character information, etc. The event state information for the save point of the video stream may be stored or otherwise made available to the game console 412 or other component of the network 100 if selected for playing.

Figure 7B:
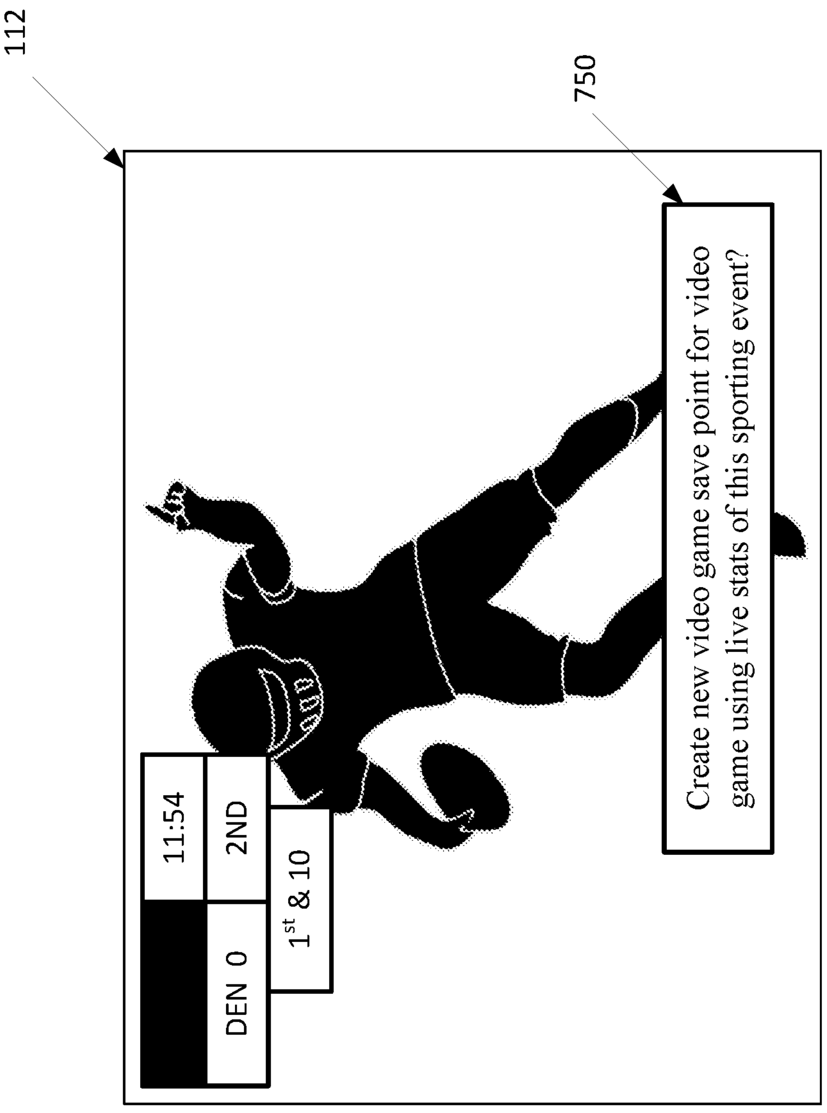

Viewers of the video stream on the streaming device 410 may also generate personalized save points for playing on the companion video game. For example, FIG. 7B is a screenshot of a display device 112 prompting 750 a user to save a content state for playing on a companion video game. A user, while viewing a football game video stream on the streaming device 410, may provide an input to the device indicating a save point within the content of the video stream based on the prompt 750. The streaming device 410 and/or the network 100 may receive or generate the most recent event state information for the video stream for one or more companion video games and store the event state information for use in generating a stored video game state. The streaming device 410 may provide for adding a descriptor or label to the save point indicated by the viewer for use in prompting the viewer on which saved point is to be played.

As shown in screenshot 702 of FIG. 7A, a visual indicator 718 of the available saved points within the content of the video stream may be displayed. The indicator 718 may include a time bar 706 with one or more locations 710-716 within the video content indicated on the time bar corresponding to the save points within the content. For example, the length of the time bar 706 may correspond to the length of the video content. The locations 710-716 indicated on the time bar 706 may be time positions within the video content of the available save points from which a companion video game state may be played. A current location, or video time, within the content may be marked by location marker 708 for reference by a viewer of the video game. In addition, the list of available save points for playing on the companion video game may correspond to the locations 710-716 indicated on the time bar 706, including both preset save points and viewer indicated save points. The locations 710-716 of the indicator 718 may be selectable based on the prompt to select a save point for playing on the video game.

The selection to play a stored content state is received at step 620 of the method 600. The event state information saved by the network 100 corresponding to the selected saved content state may be received at the game console 412 at step 622. To receive the event state information of the saved content state, the game console 412 or any other component of the network 100 may access the stored event state information for the save points in the content of the video stream. In step 612, the gaming console 412 loads the event state information with the initial game state to create a starting point of video game based on the content state, as described above. The starting point of the video game in this case corresponds to a saved point within the video stream, but is similarly playable from the point of the event state information. The saved point game state is then executed at step 614, as described.

Figure 8:
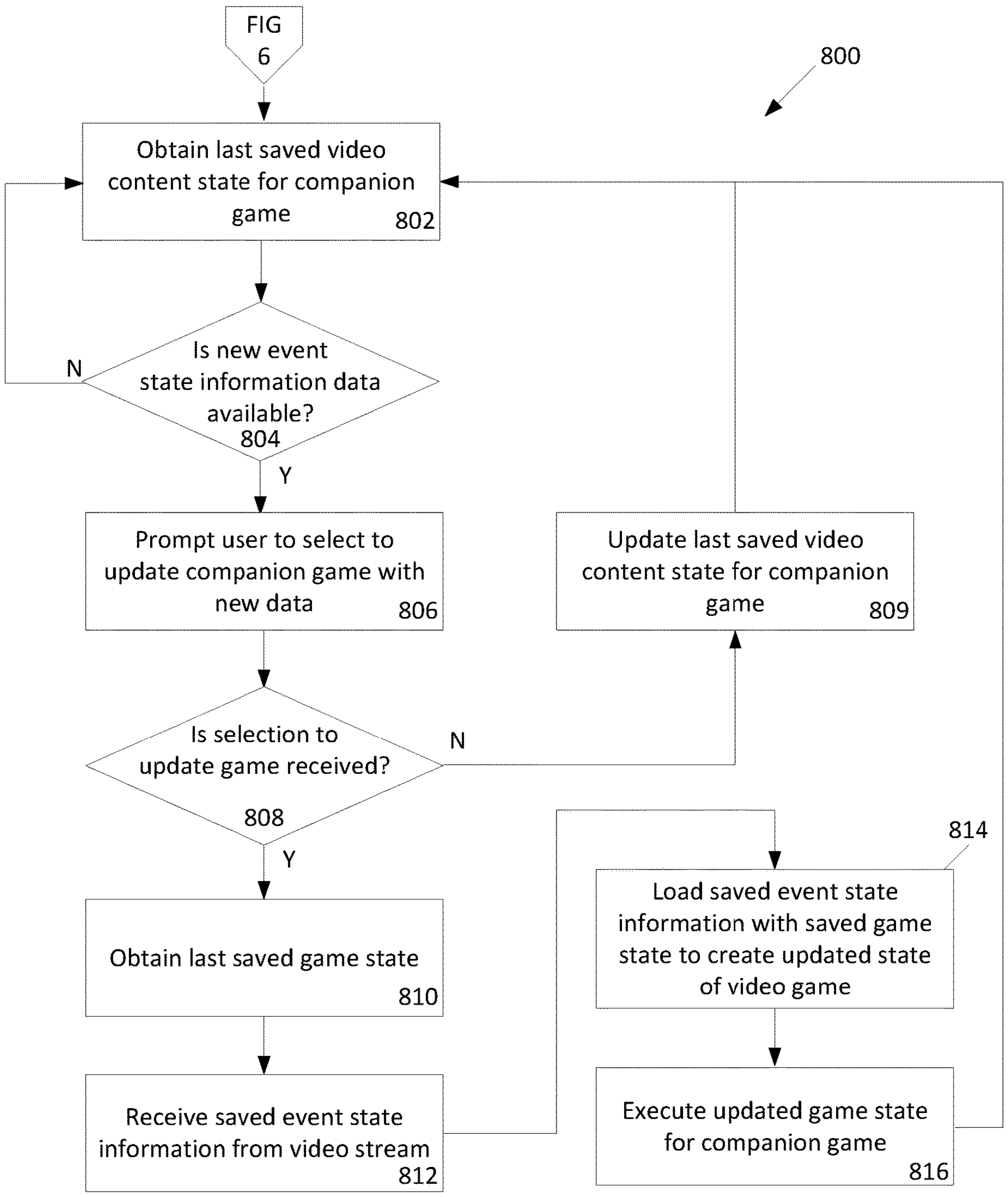
FIG. 8 is a flow chart showing an example method for updating a video game session with data from a video stream.

During execution of the companion video game, updating game states or event state information may be provided to the game console to alter or update the companion video game. FIG. 8 is a flow chart showing an example method 800 for updating a video game session with data from a video stream. The steps of the method 800 of FIG. 8 provide a more detailed description of transmission 408 of FIG. 4 discussed above. The method 800, or one or more operations of the method, may be performed by one or more computing devices or entities. For example, portions of the method 800 may be performed by components of the network 100 or the computing device 200. The method 800 or one or more steps thereof may be embodied in computer-executable instructions that are stored in a computer-readable medium, such as a non-transitory computer readable medium. The steps in this flow chart need not all be performed in the order specified and some steps may be omitted or changed in order.

At step 802, the last saved video content state for the companion game is obtained or determined by the game console 412. During execution of the companion game, the network 100 or streaming device 410 may continue to obtain and save event state information for the content of the video stream at save points within the video content stream. The last saved state of the content may be the current event state information used in the companion game or a more recent set of event state information for the content of the video stream. At step 804, the game console 412 may determine if the received saved event state information for the video stream is new event state information indicating a new save point in the content by comparing the received event state information to the last stored event state information. The event state information may include some updated data and some non-updated data. For example, a score of a football sporting event may remain unchanged for some time, while player statistics may change often. By comparing the received event state information from the previously stored event state information, the game console 412 may determine the type of event state information that is new or updated.

If no event state information is new or updated, the game console 412 may return to step 802 to check for updates to the saved content state. In some instances, the game console 412 may be configured to check for new event state information periodically, such that after an update time has elapsed, the last saved video content state may be obtained.

Figure 9:
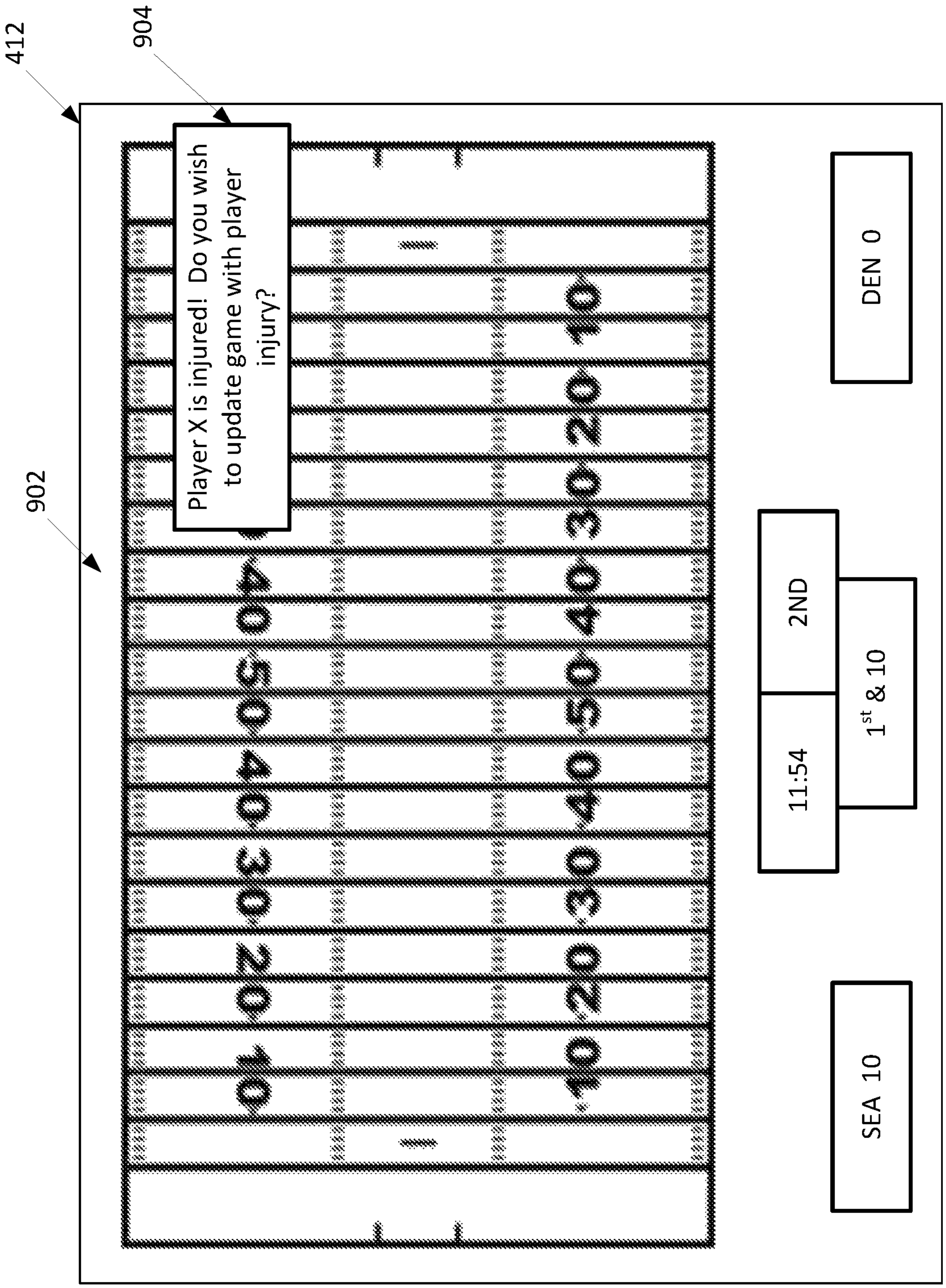
FIG. 9 is a screenshot of a video game paired with a video stream prompting a user to input new data received from a video stream while playing the video game session.

If the obtained event state information is new, the game console 412 may prompt the player to select to update the companion video game with the new event state information from the video stream. FIG. 9 a screenshot 902 of a companion video game paired with a video stream prompting a user to update the video game with new data received from a video stream while playing the video game session. The prompt 904, similar to above, may be selectable within the video game by a player of the game through an input device to the game console 412. At step 808, the game console 412 may determine if a selection to update the companion video game with the new event state information is received. If the request is not received, the method 800 may update the last saved video content state for the companion game at step 809 and return to step 802 and monitor for new event state information.

The method 800 may provide flexibility to the user in terms of the number and types of event state information are inserted into the companion video game. For example, the game console 412 may incorporate a default setting that would accept all new event state information. The user or player of the companion video game may then select which data points of the new event state information to be included in the update to the companion video game. When the user only selects certain portions of the new event state information to incorporate into the companion video game, the game console 412 may select other portions of the new event state information or the older, stored event state information for other aspects of the companion video game such that the user may experience the video game fully.

If a selection to update the video game with the new event state information is received, the game console 412 may obtain the last saved game state at step 810 for the companion video game. At step 812, the game console 412 may receive the most recent event state information from the video stream. At step 814, the game console 412 may update the last saved game state with the latest event state information from the video stream to create an updated video game state. At step 816, the updated game state may be executed such that the player may play the updated video game state with the new event state information from the video stream. The game console 412 may return to step 802 to monitor for additional updates to the event state information from the video stream of content.

The event state information associated with a video stream and provided to a companion video game may comprise additional information for use within the video game environment. For example, the event state information may include advertising information that is used by the companion video game to generate one or more advertisements within the companion video game. In the example of the football companion game, billboards or other advertisements within the arena generated in the companion video game may include advertising information provided in the event state information from the network 100. Advertising data may be included in any background or environment of any companion video game, certain products or states within the video game may be generated from the received advertisement data, commercials may be generated within the video game based on the advertisement data, etc. The advertisement data may also be based on one or more user profiles of users of the network 100. For example, the network 100 may store data, such as preferences, biographical data, habits, etc., of a viewer of the video stream of the streaming device 410. This user profile may be used by the network 100 to determine particular advertisements that may be of interest to the viewer and provide such information in the event state information of the companion video game. User profiles of multiples users of the network 100 may be aggregated and/or combined to generate still other advertisement information to include in the event state information.

A player's activities within the companion video game may also be used to generate advertisement information and/or update a user profile with the network 100. Particular inputs provided to the game console 412 during play of the companion video game may be uploaded to one or more components of the network 100 for storage. This information may be included in a user profile and used to generate the advertisements within the companion video game or during any activity with the network 100.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:

receiving, by a computing device, metadata associated with a video stream, wherein the metadata identifies titles of a plurality of different computer-executable programs;

selecting, based on the metadata, a computer-executable program from the plurality of different computer-executable programs;

causing output of an option to execute the selected computer-executable program with a starting point based on a current position in the video stream; and based on the option being selected:

retrieving event state information corresponding to the current position in the video stream; and transferring, from the computing device, to the selected computer-executable program, and via an application programming interface (API) associated with the selected computer-executable program, the event state information to cause the selected computer-executable program to execute with an initial state being based on the event state information.

2. The method of claim 1, wherein the event state information indicates one or more of:

a scenario in a sporting event, timing in a sporting event;

scoring in a sporting event;

progress in a sporting event;

a character in a sporting event;

a setting in a sporting event;

a statistic associated with a sporting event; or advertising associated with a sporting event.

3. The method of claim 1, further comprising:

outputting, for display, a list of a plurality of different save states corresponding to a plurality of different starting points associated with the video stream; and receiving a user selection from the list.

4. The method of claim 1, wherein the computer-executable program receives a user input to control movement of a character, after the execution of the selected computer-executable program.

5. The method of claim 1, wherein the execution comprises beginning a sporting event with a score that is based on the event state information.

6. The method of claim 1, wherein the computing device comprises one or more of:

a personal computer, a laptop computer, a set top box, or a server.

7. The method of claim 1, wherein each of the plurality of different computer-executable programs are compatible with the video stream.

8. The method of claim 1, wherein the retrieving further comprises:

consolidating the event state information into a batch file.

9. The method of claim 1, wherein the causing execution of the selected computer-executable program further comprises:

building an initial game state using a static game data source associated with the computing device.

10. The method of claim 1, further comprising:

retrieving updated event state information based on a new starting point in the video stream.

11. The method of claim 1, wherein the selecting further comprises:

retrieving, from a library associated with the computing device, a listing of available computer-executable programs; and comparing the listing of available computer-executable programs to the plurality of different computer-executable programs to determine the computer-executable program that is compatible with the video stream.

12. The method of claim 1, further comprising:

sending, to a remote streaming server associated with the video stream, a request to retrieve the event state information; and retrieving, from the remote streaming server and based on the request, the event state information.

13. The method of claim 1, wherein the transferring is performed by an API server.

14. The method of claim 1, wherein the computer-executable program is configured to execute on a second computing device.

15. The method of claim 1, wherein the transferring is via a wireless network.

16. The method of claim 1, further comprising:

pairing the computing device with a second computing device for execution of plurality of different computer executable programs.

17. A computing device comprising:

one or more processors; and memory storing instructions that, when executed by the one or more processors, cause the computing device to:

receive metadata associated with a video stream, wherein the metadata identifies titles of a plurality of different computer-executable programs;

select, based on the metadata, a computer-executable program from the plurality of different computer-executable programs;

cause output of an option to execute the selected computer-executable program with a starting point based on a current position in the video stream; and based on the option being selected:

retrieve event state information corresponding to the current position in the video stream; and transfer, to the selected computer-executable program via an application programming interface (API) associated with the selected computer-executable program, the event state information to cause the selected computer-executable program to execute with an initial state being based on the event state information.

18. The computing device of claim 17, wherein the event state information indicates one or more of:

a scenario in a sporting event, timing in a sporting event;

scoring in a sporting event;

progress in a sporting event;

a character in a sporting event;

a setting in a sporting event;

a statistic associated with a sporting event; or advertising associated with a sporting event.

19. The computing device of claim 17, wherein the instructions, when executed by the one or more processors, further cause the computing device to:

output, for display, a list of a plurality of different save states corresponding to a plurality of different starting points associated with the video stream; and receive a user selection from the list.

20. The computing device of claim 17, wherein the computer-executable program receives a user input to control movement of a character after the execution of the selected computer-executable program.

21. The computing device of claim 17, wherein the execution comprises beginning a sporting event with a score that is based on the event state information.

22. The computing device of claim 17, wherein the computing device comprises one or more of:

a personal computer, a laptop computer, a set top box, or a server.

23. The computing device of claim 17, wherein each of the plurality of different computer-executable programs are compatible with the video stream.

24. One or more non-transitory computer-readable media storing instructions that, when executed, cause:

receiving, by a computing device, metadata associated with a video stream, wherein the metadata identifies titles of a plurality of different computer-executable programs;

selecting, based on the metadata, a computer-executable program from the plurality of different computer-executable programs;

causing output of an option to execute the selected computer-executable program with a starting point based on a current position in and current information associated with the video stream; and based on the option being selected:

retrieving event state information corresponding to the current position in the video stream; and transferring, from the computing device, to the selected computer-executable program, and via an application programming interface (API) associated with the selected computer-executable program, the event state information to cause the selected computer-executable program to execute with an initial state being based on the event state information.

25. The one or more non-transitory computer-readable media of claim 24, wherein the event state information indicates one or more of:

a scenario in a sporting event, timing in a sporting event;

scoring in a sporting event;

progress in a sporting event;

a character in a sporting event;

a setting in a sporting event;

a statistic associated with a sporting event; or advertising associated with a sporting event.

26. The one or more non-transitory computer-readable media of claim 24, wherein the instructions, when executed, further cause:

outputting, for display, a list of a plurality of different save states of the event corresponding to a plurality of different starting points associated with the video stream; and receiving a user selection from the list.

27. The one or more non-transitory computer-readable media of claim 24, wherein the computer-executable program receives a user input to control movement of a character after execution of the selected computer-executable program.

28. The one or more non-transitory computer-readable media of claim 24, wherein the execution comprises beginning a sporting event with a score that is based on the event state information.

29. The one or more non-transitory computer-readable media of claim 24, wherein the computing device comprises one or more of:

a personal computer, a laptop computer, a set top box, or a server.

* * * * *